UNITED STATES PATENT OFFICE.

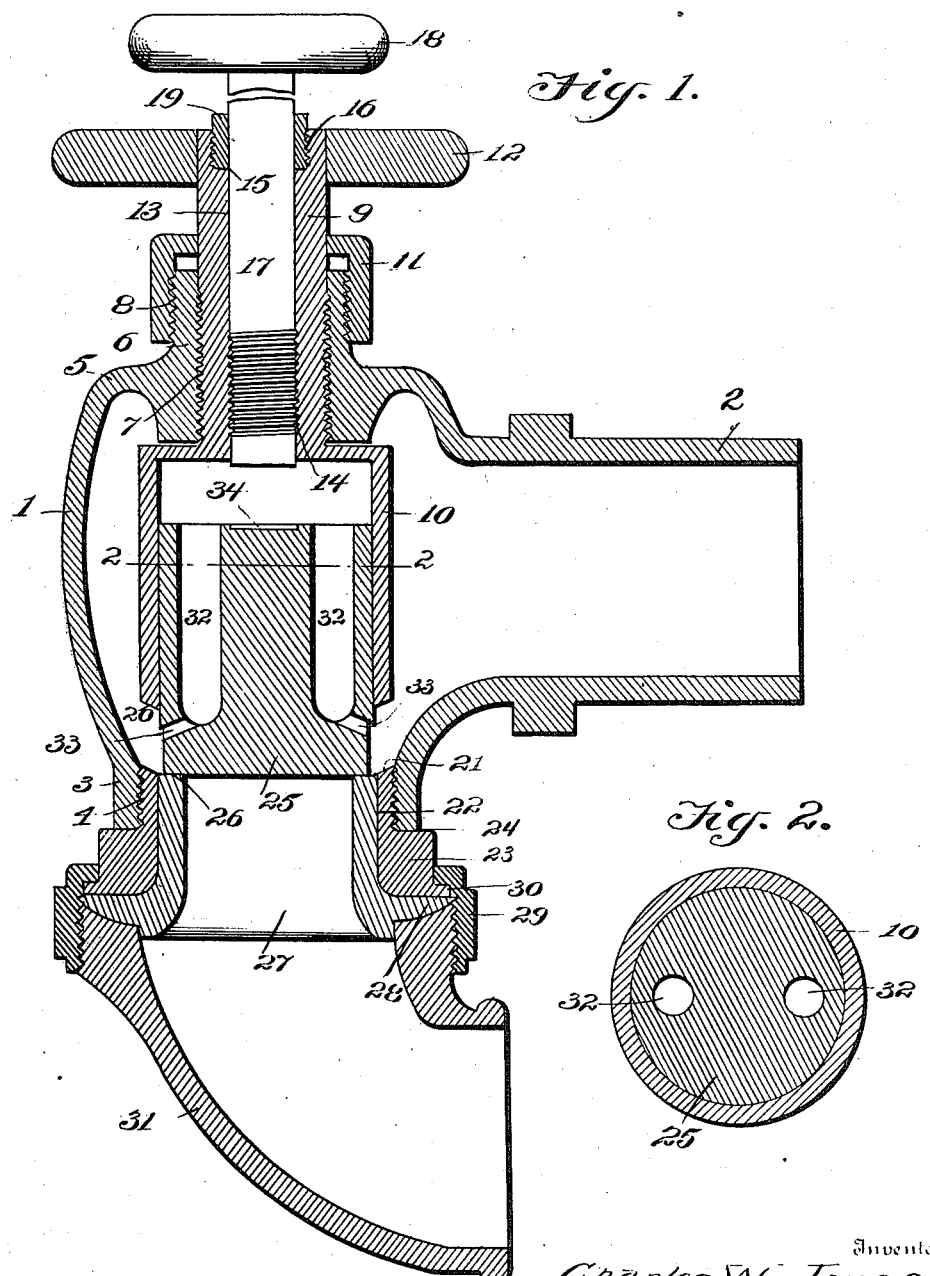

CHARLES W. JONES AND JAMES A. GIBSON, OF URBANA, ILLINOIS.

VALVE.

963,152.

Specification of Letters Patent. Patented July 5, 1910.

Application filed April 21, 1909. Serial No. 491,401.

*To all whom it may concern:*

Be it known that we, CHARLES W. JONES and JAMES A. GIBSON, citizens of the United States, residing at Urbana, in the county of Champaign and State of Illinois, have invented new and useful Improvements in Valves, of which the following is a specification.

Our invention relates to improvements in check and stop valves for steam boilers.

The primary object of the invention is the provision of a valve of this character wherein the check valve and its seat may be readily and quickly removed when necessary to repair or replace the same.

A further object of the invention is the provision of a valve of the above stated character wherein the movement of the check valve may be regulated and varied.

A further object of the invention is the provision of a valve of the above stated character wherein the movements of the check valve shall be noiseless.

A still further object of the invention is the provision of a valve of the above stated character which shall comprise comparatively few parts, which shall be simple, durable and efficient in construction, and which may be manufactured and sold at a comparatively low cost.

With the above and other objects in view the invention consists in the construction, combination and arrangement of parts hereinafter fully described and claimed, and illustrated in the accompanying drawing, wherein:—

Figure 1 is a sectional view taken on a plane extending vertically and centrally through a check and stop valve constructed in accordance with our invention, and Fig. 2 is a sectional view taken on the horizontal plane indicated by the line 2—2 of Fig. 1.

Referring to the drawing by reference numerals, 1 designates a casing provided at its outlet with a coupling extension 2 and at its inlet with a depending extension 3, the depending extension being provided in its inner surface with screw threads 4. In its upper wall 5 the casing 1 is provided with an opening which is surrounded by a neck 6 extending above and below the wall.

The inner surface of the neck 6 is screw-threaded as at 7, and the outer surface of the outer portion of the neck is screw-threaded as at 8. The stem 9 of a hollow cylindrical stop valve 10, which has its lower end fully open and its upper end fully closed, has threaded engagement with the threads 7 of the neck 6, and a bonnet 11 has threaded engagement with the threads 8 of the neck. The stem 9 projects above the bonnet 11 and is provided with a hand wheel 12. A passage 13 extends through the stem 9 and at a point adjacent its inner end is provided with screw-threads 14. In its upper end the stem 9 is provided with a recess 15 having its vertical wall 16 screw-threaded. A bolt 17 has threaded engagement with the threaded portion 14 of the passage 13 and is greater in length than the stem 9. At its upper end the bolt 17 is provided with a hand wheel 18. A packing nut 19 is mounted in the recess 15 of the stem 9 and encircles the bolt 17, said nut having threaded engagement with the vertical wall 16 of said recess. The lower edge of the stop valve 10 is beveled as at 20, said edge being adapted to engage a beveled seat 21, formed on the upper edge of an annular member 22 which has threaded engagement with the threads 4 of the casing extension 3. The seat member 22 is provided with an enlarged portion 23 which provides a shoulder 24 engaging the outer edge of the extension.

A solid cylindrical check valve 25 is slidably mounted within the stop valve 10 and is adapted to engage a seat 26 formed on the upper edge of an annular member 27. The seat member 27 is provided near its lower end with a horizontally disposed flange 28 which engages the under side of the enlarged portion 23 of the seat member 22. A union nut 29 engages a shoulder 30 formed on the enlarged portion 23 of the seat member 22 and has threaded engagement with a coupling 31, the upper edge of the coupling engaging the flange 28 of the seat member 27. Passages 32 extend longitudinally of and open out through the upper end of the check valve 25, and ports 33 extend from the side of the check valve to the passages. In its upper side the check valve 25 is provided with a recess 34 adapted to receive the inner end of the bolt 17.

After the valve has been applied, the stop valve 10 is unseated. The diameter of the lower portion of the check valve 25 is smaller than the inner diameter of the stop valve 10, whereby to establish communication between the ports 33 and the interior of the casing when the stop valve is unseated. When the check valve 25 is seated the ports 33 are located below the stop valve 10. The water which remains between the upper end of the check valve 25 and the closed end of the stop valve 10 forms a cushion which renders the movement of the check valve noiseless. The check valve 25 may be seated and its movements varied through the movements of the bolt 17.

When it is desired to remove the seat member 27 and the check valve 25 the stop valve 10 is seated. After the stop valve 10 has been seated the union nut 29 is turned out of engagement with the coupling 31, permitting the removal of the coupling, the seat member 27, and the check valve 29. As the check valve 25 and the seat member 27 may be removed either one or both may be readily and quickly repaired or replaced. The seat member 22 may also be quickly and readily removed. After the removal of the seat member 22, to remove the stop valve 10 it is only necessary to remove the hand wheels 12 and 18.

It should be apparent from the above description, taken in connection with the accompanying drawing, that we provide a check valve for steam boilers wherein the parts may be readily and quickly removed when it is desired to repair or replace the same, one which is simple, durable and efficient of construction, and one which may be manufactured and sold at a comparatively low cost.

While we have described the method of operation of the invention, together with the apparatus which we now consider to be the best embodiment thereof, we desire to have it understood that the apparatus shown is merely illustrative and that such changes may be made when desired as are within the scope of the claims.

Having thus described the invention, what is claimed as new is:—

1. A valve of the character set forth comprising a casing having an inlet and an outlet, a check valve mounted in the casing, a stop valve mounted in the casing and slidably receiving the check valve, said stop valve being provided with a stem having threaded engagement with the casing, and a bolt carried by the stem of the stop valve and adapted to be adjusted to vary the movement of the check valve.

2. A valve of the character set forth comprising a casing having an inlet and an outlet, a seat member threadedly secured in the inlet of the casing, another seat member removably secured to said first-named seat member, a check valve mounted in the casing, a stop valve mounted in the casing, and means by which the stop valve may be operated.

3. A valve of the character set forth comprising a casing having an inlet and an outlet, a seat member threadedly secured in the inlet of the casing, another seat member arranged within the first-named seat member, a coupling, a union-nut engaging the first-named seat member and the coupling, said nut securing the coupling and said second-named seat member in applied position, a check valve mounted in the casing, a stop valve mounted in the casing, and means by which the stop valve may be operated.

4. A combined check and stop valve comprising a casing having an inlet and an outlet, a hollow cylindrical stop valve mounted within the casing, means by which the stop valve may be operated, and a cylindrical check valve movably mounted within the stop valve.

5. A combined check and stop valve comprising a casing having an inlet and an outlet, a hollow cylindrical stop valve mounted in the casing, means by which the stop valve may be operated, and a cylindrical check valve movably mounted in the stop valve, said check valve being provided with passages opening out through the upper end thereof and communicating at their lower ends with ports opening out through the side of the check valve.

6. A combined check and stop valve comprising a casing having an inlet and an outlet, a stop valve mounted in the casing, means by which the stop valve may be operated, a check valve mounted in the casing, and means by which the movements of the check valve may be controlled, said last named means being carried by the stop valve.

7. A combined check and stop valve comprising a casing having an inlet and an outlet, a hollow cylindrical stop valve mounted in the casing and provided with a hollow stem extending through the casing, a cylindrical check valve movably mounted in the stop valve, and a bolt mounted in the stem of the stop valve and adapted to be adjusted to vary the movements of the check valve.

8. A combined check and stop valve comprising a casing having an inlet and an outlet, a hollow cylindrical stop valve in the casing having its upper end fully closed and its lower end fully open, a cylindrical check valve movably mounted in the stop valve and having its lower portion smaller than the inner diameter of the stop valve, said check valve being provided with passages opening out through the upper end thereof and communicating at their lower ends with ports opening out through the smaller end of the check valve, and means by which the check valve may be operated.

In testimony whereof we affix our signatures in presence of two witnesses.

CHARLES W. JONES.
JAMES A. GIBSON.

Witnesses:
CHAS. M. WEBBER,
HOWARD F. ROBINETT.